United States Patent [19]

Umeda et al.

[11] Patent Number: 4,759,797

[45] Date of Patent: Jul. 26, 1988

[54] COLOR-DEVELOPING AGENT FOR PRESSURE-SENSITIVE RECORDING

[75] Inventors: Hiroaki Umeda; Mamoru Suzuki; Akira Hasegawa; Kunio Hata, all of Tokyo, Japan

[73] Assignee: Jujo Paper Co., Ltd., Tokyo, Japan

[21] Appl. No.: 44,987

[22] Filed: Apr. 30, 1987

Related U.S. Application Data

[62] Division of Ser. No. 872,184, Jun. 9, 1986, Pat. No. 4,749,680.

[30] Foreign Application Priority Data

Jul. 9, 1985 [JP] Japan ............................... 60-159540

[51] Int. Cl.$^4$ ............................................ C09D 11/08

[52] U.S. Cl. ........................................ 106/30; 106/21; 427/150; 503/216; 503/212; 503/225; 525/534; 528/205

[58] Field of Search .................... 106/21, 30; 503/216, 503/225, 212; 528/205; 525/534

[56] References Cited

U.S. PATENT DOCUMENTS 4,081,425 3/1978 Gscheidmeier ....................... 260/62

FOREIGN PATENT DOCUMENTS 2073226A 10/1981 United Kingdom .

*Primary Examiner*—John F. Niebling
*Assistant Examiner*—Isabelle Rodriquez
*Attorney, Agent, or Firm*—Koda and Androlia

[57] ABSTRACT

The color-developing agent for pressure-sensitive recording sheet comprises the polyvalent-metal salt of carboxylated terpenephenol resin. The color-developing sheet containing the above color-developing agent provides excellent yellowing-resistance, superior color-developing ability and improved fastness of the colored image.

4 Claims, No Drawings

COLOR-DEVELOPING AGENT FOR PRESSURE-SENSITIVE RECORDING

This is a division of application Ser. No. 872,184, filed June 9, 1986, now U.S. Pat. No. 4,749,680.

BACKGROUND OF THE INVENTION

1. Field of the Invention

This invention relates to a color-developing agent for pressure-sensitive recording sheets and a color-developing sheet which contains this color-developing agent.

2. Prior Art

Pressure-sensitive recording sheets are known as carbonless copying paper. They produce a color upon the application of a mechanical or impact pressure by writing or by pounding a typewriter, thus permitting duplication of several copies. The color is based on a color forming reaction between an electron-donating colorless dye and an electron-accepting color-developing agent.

As typical pressure-sensitive recording sheets there are transfer-type pressure-sensitive recording sheets and single sheet type pressure-sensitive recording sheet.

The transfer-type pressure-sensitive recording sheets are described in detail as follows.

The back surface of a tp (CB: Coated Back) sheet is coated with microcapsules having a diameter of several microns to ten and several microns and composed of a shell of a polymeric film such as gelatin, urea-formaldehyde resin and melamine-formaldehyde resin and of a solution of a colorless color-forming pressure-sensitive dye (leuco dye) in an involatile oil enclosed therein. The front surface of the bottom (CF: Coated Front) sheet is coated with a layer contaiing a color-developing agent having the property of reacting with the colorless dye upon contact therewith and thus producing a color.

The back surface and the front surface of the middle (CFB) sheet are coated with pressure-sensitive dye-containing microcapsules and color-developing agent on a base sheet, respectively. When a localized pressure is applied by a ball pen, typewriter etc. to pressure-sensitive recording sheets composed of a CB-sheet, a CF sheet and, if necessary, one or more CFB-sheets, so that the microcapsules-coated surface faces the surface coated with the color-developing agent-containing layer, the microcapsules under the applied pressure are ruptured and the solution of the carbonless dye moves to the color-developing agent-containing layer. Thus, the dye reacts with the color-developing agent to form a colored image in the desired pattern of recording.

On the other hand, in the single-type pressure-sensitive recording sheets, the pressure-sensitive dye-containing microcapsules and color-developing agent are coated as laminated layers or a mixed state-layer on the same surface of a base sheet.

Further, there is known a pressure-sensitive recording sheet, wherein the color-developing printing ink which contains pressure-sensitive dye-containing microcapsule and a color-developing agent as such or in capsule-form, is spot-printed on the required surface of a base sheet.

Still further, the color-developing agent which is dissolved in a solvent is used to check the state of the surface coated with dye-containing microcapsules. The color-developing agent of this invention is applicable for any uses as color-developing sheet, color-developing printing ink, color-developing solution, and so on.

The color-developing agents which are conventionally known include inorganic solid acids such as activated clay, attapulgite and so on (described in U.S. Pat. No. 2,712,507); substituted phenols and diphenols (described in the Japanese Patent Publication No. 9309/1985); P-substituted phenol-formaldehyde polymers (described in the Japanese Patent Publication No. 20144/1967); aromatic, carboxylic acid metal salts (described in the Japanese Patent Publication No. 10856/1974); 2,2′-bisphenol sulfone compounds (described in the Japanese Patent Laid-Open No. 106313/1979); and so on.

These known color-developing agent and the sheets coated therewith have both advantages and disadvantages. For example, inorganic solid acids are as advantage inexpesive and excellent in color-developing speed, but they have disadvantages that a color-developing ability deteriorates in a storage owing to the absorption of gases and moisture in the air, and the developed images discolor or fade prominently upon exposure to sunlight, fluorescent light etc. The substituted phenols provide insufficient color-developing ability and inferior image density.

P-substituted phenol-formaldehyde polymers (p-phenyl-p-phenolnovolak resin etc.) have superior color-developing ability, but have the disadvantage that the coating sheet undergoes yellowing upon exposure to sun light or gases in the air in th storage.

The aromatic carboxyic acid metal salts are superior in color-developing ability, light fastness of the colored image and resistance to yellowing under light, gas, etc. but their water-resistance and plasticizer resistance are not entirely satisfactory.

SUMMARY OF THE INVENTION

It is required that the color-developing agent and a color-developing sheet for the pressure-sensitive recording sheets are excellent in whiteness, color-developing ability and fastness of the developed image immediately after manufacturing the sheets, and exhibit no change of the properties in storage by gases and moisture in the atmosphere and by chemicals such as water, plsticizer etc., by the ight such as sunlight, or fluorescent light.

It is an object of this invention to provide a color-developing agent and a color-developing sheet applied therewith which have the yellowing-resistance under UV-light, gases in the air, etc., and no fading of the colored image by plasticizer etc., taking into the consideration that the conventional organic color-developing agent and color-developing sheet have inferior yellowing-resistance and plasticizer-resistance.

The above object can be achieved by using a polyvalent metal salt of carboxylated terpenephenol resin produced by condensing cyclic monoterpene and phenol in presence of acidic catalyst, introducing carboxyl group into the condensing product and causing the reaction of the product with polyvalent metal. The color-developing agent of the present invention provides as advantages a color-developing sheet for pressure sensitive recording sheets having excellent yellowing-resistance under the exposure of gases, UV-light, etc. in the air, superior color-developing ability for the pressure-sensitive dye and improved fastness of the colored image under the action of sunlight, plasticizer, etc.

DETAILED DESCRIPTION OF THE INVENTION

The condensation reaction of this invention between monoterphene and phenol is carried out by a well-known method (described, for example, in U.S. Pat. No. 2,811,564). That is, phenols are dissolved in a solvent, for example, aromatic carboxyhydrate such as benzene, toluene, xylene, etc; halogenized carboxyhydrate, such as dichloromethane, chloroform etc; aliphatic carboxyhydrate; and the like.

An acidic catalyst is added to the dissolved phenol, and then a cyclic monoterpene is dropwise added thereto in the range of room temperature to 70° C. to produce the aimed product.

Cyclic monoterpens used in this invention include, for example, pinene, isolimonene, terpinolene terpinene, phellandrene, bornylene, camphene, 2,8(9)-p-menthadiene, etc. and the mixtures thereof, or cyclic monoterpene as natural resources such as gum-turpentine oil which contains α-pinene as main ingredient, pine oil, dipentene which contains α-limonene as main ingredient, and the like.

Phenols used in the invention include, for example alkyl-substituted phenols or alkoxy-substituted phenols such as carbolic acid, cresol, tert.-butylphenol, isopropylphenol, ethylphenol, tert.-acetylphenol, cumyphenol, phenylphenol, cyclohexylphenol, methoxyethylphenol, sec.-butylphenol or tert.-amylphenol; polyvalent phenols such as catechol, resorcinol, hydroquinone, orcinol, pyrogallol, hydroxyquinone, etc.; halogenated phenols such as chlorophenol, bromophenol etc.; naphthol; dihydroxynaphthalene; and the like.

Such phenols are appropriately used according to properties of a pressure-sensitive recording sheet, its production-cost etc. preferably carbolic acid is used.

The ratio between the phenol and the terpene to be used in this invention is not otherwise limited. However, in ordinary case, it is suitable to use 0.1–10 mole, preferably 0.4–5 mole, of phenol, per mole of terpene. If the amount of phenol is decreased, the color-developing ability become inferior. If the amount of phenol is increased, the yellowing-resistance become insufficient.

Acidic catalysts used in this invention include, for example, boron trifluoride, aluminium trichloride, stannic chloride, zinc chloride, phosphoric acid, polyphosphoric acid, aromatic sulfonic acid, sulfuric acid, hydrochloric acid, and the like.

The temperature and time of the reaction are determined depending upon the species of raw material, the specis of catalyst and the aimed compound.

However, the reaction conditions include preferably room temperature to 90° C. for 3 to 30 hours, more preferably 30° to 50° C. for 6 to 9 hours. After the completion of the reaction, the solvent is removed by steam distillation etc. and the catalyst is decomposed to be removed.

In this manner, various terpene-phenol resins are obtained depending upon the reaction temperature, reaction time, the species and amount of acidic catalyst, the mole ratio between terpene and phenol, and the like.

However, it is preferred that the terpene-phenol resin has an average molecular weight of 350–1000 (analysed by GPC) and softening point (melting point) of at least 70° C.

The structure of the obtained resin is complicated and can not be described by a certain formula.

However, in the case that α-pinene as cyclomonoterpene and carbolic acid as phenol are used, the condensation reaction and the obtained product are illustrated by the following equation:

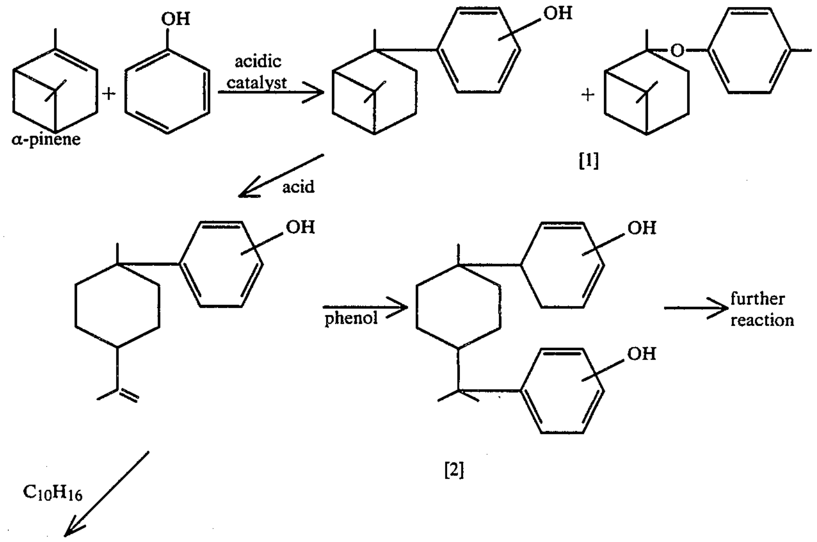

α-pinene
[1]
[2]

-continued

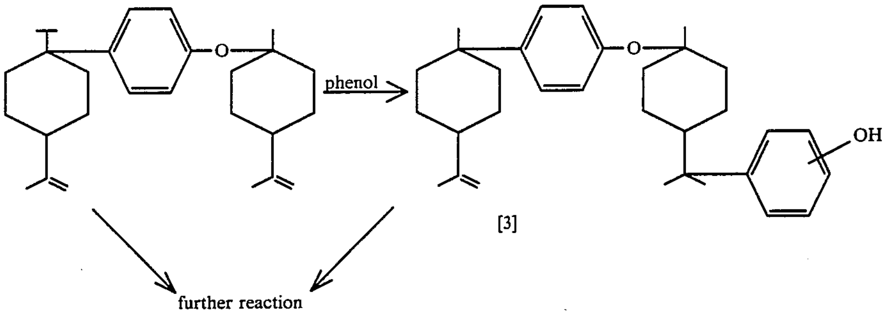

[3]

Namely, it is contemplated that 1 mole of α-pinene is added with 1 mole of phenol (product [1] in the above reaction path), the addition product of the α-pinene and phenol is ring-opened, the ring-opened addition product is added and condensed with phenol or α-pinene repeatedly to form the product [2] and product [3], and thereby terpenephenol resin is formed.

Next, a carboxyl group is introduced into the thus obtained terpenephenol resin. Various methods of introducing the carboxyl group into the known compound having aromatic ring be applied. Preferable method is the so-called Kolbe-Schmitt's reaction in which the terpenephenol resin, together with an alkali such as metallic sodium, metallic potassium or sodium bicarbonate, is allowed to react with carbon dioxide gas under high temperature and high pressure.

The carboxylated terpenephenol resin thus obtained is polyvalent-metallized by a method which comprises melting the carboxylated terpenephenol resin together with oxides, hydroxides, chlorides, carbonates or sulfates of polyvalent metals and inorganic ammonium salts such as ammonium carbonate by heating them to 100° to 150° C. and thereby making them to react, a method which comprises dissolving the carboxylated terpenephenol resin together with hydroxides of alkali metals such as sodium hydroxide and potassium hydroxide in alcohol, adding alcohol-soluble polyvalent metal salts thereto and thereby carrying out the reaction, etc. Hereafter, the useless solvent and unreactive inorganic compounds are removed by distillation, neutralization, extraction, etc. Then, washing with water and drying are performed to obtain the color-developing agent of the present invention, namely the polyvalent-metal salt os carboxylated terpenephenol resin.

Polyvalent metal used in this invention includes, for example, magnesium, aluminium, calcium, cadmium, titanium, zinc, nickel, cobalt, manganese, etc.

Magnesium, aluminum and zinc are preferable, and zinc is most preferable.

The obtained polyvalent metal salt of carboxylated terpenephenol resin of this invention is a novel color-developing agent which is previously unknown for a pressure-sensitive color-developing sheet. The color-developing agent of this invention can be used alone or in combination with the known color-developing agent, for example, inorganic solid acid such as activated clay, phenol-formaldehyde novolak resin, substituted phenol resin, and metal salt thereof, aromatic carboxylic acid metal salt, and the like.

The color-developing sheet which contains the color-developing agent of this invention is prepared by the conventionally known method, for example:

(a) applying on a support such as paper, an aqueous coating color in which an aqueous suspension of a color-developing agent is used;

(b) adding the color-developing agent to the stuff in a paper making; or (c) coating on the surface of the support the organic solvent in which a color-developing agent is dissolved or suspended, and then drying the coated support.

The coating color is produced by mixing kaolinclays, calcium carbonate, starch, polyvinyl alcohol and synthetic or natural latex, and then giving appropriate viscosity and coating suitability for the mixed materials. It is desirable to use 10 to 70% by weight of the color-developing agent, based on the total solid content in the color developing layer. If the color-developing agent is less than 10% by weight, the sufficient results cannot be attained. If the color-developing agent is more than 70%, the surface properties of the color-developing sheet is inferior.

The coating weight is more than 0.5 $g/m^2$, preferably 1.0–10 $g/m^2$. The color-developing agent of this invention can be used for the conventionally known pressure-sensitive color-forming dye. Examples of these dyes are as follows.

Triphenylmethane leuco dyes

Crystal violet lactone, malachite green lactone, 3-dimethylamino-triphenylmethanephthalide, and the like.

Fluoran leuco dyes 3,6-dimethoxyfluoran, 3-N-cyclohexylamino-6-chlorofuran, 3-diethylamino-6-methyl-7-chlorofluoran, 1,2-benzo-6-dimethylaminofluoran, 1,2-benzo-(2',-diethylamino)-6-diethylaminofluoran, 3-diethylamino-7-dibenzylaminofluoran, 3-diethylamino-6-methyl-7-dibenzylaminofluoran, 3-diethylamino-5-methyl-7-dibenzylaminofluoran, 3-diethylamino-7-aminofluorane, 3-diethylamino-7-(o-acetyl)anilinofluoran, 3-diethylamino-7-piperidinofluoran, 3-diethylamino-7-pyrolidinofluoran, and the like.

Spiopyran leuco dyes spiro-[3-methylchromene-2,2'-7'-diethylaminochromene], spiro[3-methylchromene 2,2'-7'-dibenzylaminohromene], 6',8'-dichloro-1-3,3-trimethylindolino-benzospiraopyran, 1,3,3-trimethyl-6'-nitrospiro(indoline)-2,2'-2'H chromene, spiro[1,3,3-trimethylindoline-2,3'-8'-bromonaphtho-[2,1-b]pyran], spiro[3-methyl-benzo(5,6-a)chromene]-2,2'-7'-diethylaminochromene and the like.

Phenothiazine leuco dyes 3-diethylamino-7(N-methylanilino)-10-benzoylphenoxazine; 3,7-bis(dimethylamino)-10-benzoylphenothiazine, 10-(3',4',5'-trimethoxy-benzoyl)-3,7-bis-(dimethylamino)-phenothiazine, and the like.

Phthalide leuco dyes 3-4(diethylamino-2-ethoxyphenyl)-3-(1-ethyl-2-methylindol-3-yl)7-azaphthalide, and the like.

Indol leuco dyes 3,3-bis(1-octyl-2-methylindol-3- yl)phthalide, and the like.

Triphenylmethane leuco dyes

N-butyl-3[bis-4-N-methylanilino)phenyl methyl]carbazone and the like.

[Function]

The polyvalent-metal salt of carboxylated terpene-phenol resin of the present invention shows excellent yellowing resistance and plasticizer-resistance of the colored image while maintaining the color density and color developing speed. The reason for this is unknown. However, it can be assumed that, if the yellowing of the color-developing agent is mainly due to the quinonation of a phenolic hydroxyl group, the quinonation of the phenolic hydroxy group is hindered by carboxyl group and polyvalent metal salt which were newly introduced.

Further, it can be presumed that, if the coloring of pressure sensitive coloring dye is the outcome of the formation of a sort of complex by the electronic interaction between the pressure sensitive color-forming dye and color-developing agent, compared with complexes of the color forming dye and conventional organic developers, especially phenolic color-developing agent, the complex of the color-forming dye and the color-developing agent of the present invention gives the intense interaction between them due to the introduction of the carboxyl group and polyvalent-metallization, and even when it contacts with the plasticizer, it is scarcely dissolved in the plasticizer not to lose the complex. This is sought to be a main cause for the improvement of the plasticizer-resistance.

Furthermore, it can be presumed that, the color-developing speed is maintained because the color-developing agent is adequately dissolved in the aromatic solvent, the solvent for the pressure sensitive color-forming dye, and the excellence in coloring density is due to the enhancement of the color-developing ability of the phenolic hydroxyl group by the introduction of the carboxyl group and inclusion of the polyvalent metal.

EXAMPLES

Hereinafter, parts and % means parts by weight and % by weight, respectively.

(SYNTHESIS EXAMPLE 1)

1-(1):

98 g (1 mole) of carbolic acid were dissolved in 200 ml of toluene. The resultant solution, together with 56.8 g of ethyl ether complex of boron trifluoride, was placed in a 1 liter flask. 136 g (1 mole) of gum turpentine (manufactured by Arakaws Kagaku Co., Ltd., Toyo Matsuin turpentine oil) were added dropwise thereto for about 2 hours while keeping the temperature at below 20° C. After the completion of the dropping, the temperature was raised to 35° to 40° C. and the reaction is carried out for 8 hours. After the completion of the reaction, the organic layer was separated out by decantation. Water was added to the residual layer to decompose the catalyst. The reaction product was extracted with isopropyl ether. The aforesaid organic layer was admixed with the extract, and the admixture was washed with water and dried over anhyrous sodium sulfate. The solvent and unreactants were separated out by distillation at 180° to 200° C. under reduced pressure. The unreactive carbolic acid and turpentine oil were removed by steam distillation to obtain 140 g of terpene-phenol resin. The average molecular weight of the terpene-phenol resin thus obtained was determined by high-pressure liquid chromatography GPC. Average molecular weight: 680. Melting point: 118° C.

1-(2):

140 g of the above resin were dissolved in 200 ml xylene, and were charged in an autoclave of 500 ml-content. 7.7 g of metallic sodium were added thereto, heated to 150° C., stirred for 1 hour. Then carbon dioxide gas was charged until pressure in the autoclave reached 40 kg/cm$^2$. After 1 hour, the pressure was decreased to 200 kg/cm$^2$. The reaction was further carried out for 1 hour. After cooling, the gases were removed, the content was introduced in water, and it was neutralized with acid solution. The reaction product was extracted with isopropyl ether, washed out with water, dried over anhydrous sodium sulfate. After removing the solvent, 130 g of carboxylated terpene-phenol resin were obtained.

1-(3):

100 g of the above carboxylated terpenephenol resin were heated to temperature of 40°-150° C. with stirring, and thereto was added a dry mixture of 4.0 g of zinc oxide, and 8.0 g of ammonium bicarbonate. After cooling, 98 g of zinc salt of carboxylated terpenephenol resin were obtained (Melting point: 85° C., this is named as Compound No. 1)

[SYNTHESIS EXAMPLE 2]

2-(1):

The procedure in 1-(1) of Synthesis Example 1 was repeated except that the mole ratio of gum turpentine to carbolic acid was 1:2.

2-(2):

The procedure in 1-(2) of Synthesis Example 1 was repeated except that 2.5 g metallic sodium based on 100 g of terpenephenol resin were used.

2-(3):

100 g of the above carboxylated terpenephenol resin and 5 g of pulverized sodium hydroxide were charged into a glass vessel and 140 m of methanol were added thereto to dissolve the product. The dissolved product was heated to 50° C., and 100 ml of methanol which contains 10 g of zinc-chloride were added dropwise thereto. The reaction was carried out with stirring at 50° C. for one hour, then the solvent was removed under vacuum. In this manner, a milky white solid was obtained. After drying and pulverizing, the polyvalent metal salt of carboxylated terpenephenol resin (melting point: 110° C.) was obtained (this is named as Compound No. 2).

[SYNTHESIS EXAMPLE 3]

A terpenephenol resin obtained by the procedure in 1-(1) except that the mole ratio of gum turpentine to carbolic acid was 1:5. 8.4 g of metallic sodium were added thereto, and carboxy group was introduced by the procedure of 1-(2). 4.5 g of zinc oxide and 8 g of ammonium bicarbonate were added thereto, were heated by the procedure in 1-(3) to melt the product. In this manner, zinc salt of carboxylated terpenephenol resin was obtained (this is named as Compound No. 3).

[SYNTHESIS EXAMPLE 4–13]7

Terpenephenol resins were obtained by following the procedure in Synthesis Example 1-(1), using the species and mole ratios of cyclic monoterpene and phenol in presence of acidic catalyst, as shown in Table 1.

The introduction of carboxyl group was carried out in the same manner as in Synthesis Example 1-(2) in which the species of alkali and the amount of alkali, based on 100 g of terpenephenol resin were varied as shown in Table 1.

Further, the species and the amount of chemicals, and the procedure used for the formation of polyvalent metal salt, were shown in Table 1.

TABLE 1

Synthsis of color-developing agent

| Compound No. | Terpenephenol resin (TP): Terpene (T) | Phenol (P) | Cotalyst | Mole motio of T/P | (CTP): Alkali | Amount*1 |
|---|---|---|---|---|---|---|
| 1 | Gum tarpentine | Carbolic acid | $BF_3$.E | 1:1 | metallic Na | 5, 5 g |
| 2 | " | " | $BF_3$.E | 1:2 | " | 2, 5 |
| 3 | " | " | $BF_3$.E | 1:5 | " | 6, 0 |
| 4 | " | " | Polyphosphoric-acid-Phosphoric-acid | 1:1 | NaOH | 5, 0 |
| 5 | " | " | Polyphosphoric-acid-Phosphoric-acid | 1:2 | " | 10, 0 |
| 6 | Limonene | " | Polyphosphoric-acid-Phosphoric-acid | 1:2 | metallic Na | 6, 5 |
| 7 | " | " | Al $Cl_3$ | 1:2 | KOH | 9, 0 |
| 8 | Dipentene | " | $BF_3$.E | 1:0, 5 | " | 4, 5 |
| 9 | " | " | $BF_3$.E | 1:1 | KHCO3 | 15, 0 |
| 10 | " | " | $BF_3$.E | 1:3 | metallic Na | 7, 0 |
| 11 | Gum tarpentine | O—Cresol | Al $Cl_3$ | 1:2 | " | 6, 0 |
| 12 | Dipentene | Resorcin | $BF_3$.E | " | " | 6, 0 |
| 13 | Gum tarpentine | Carbolic acid | $BF_3$.E | 1:1 | NaOH | 10, 0 |

| Compound No. | Polyvalent metal salt fomation of CTP: Alkali | Amount*1 | Polyvatant metal | Amount*1 | Reaction method*2 |
|---|---|---|---|---|---|
| 1 | $NH_4HCO_3$ | 4g | Zn O | 8 g | 1-(3) |
| 2 | NaOH | 5 | Zn $Cl_2$ | 10 | 2-(3) |
| 3 | $NH_4HCO_3$ | 4, 5 | Zn O | 9 | 1-(3) |
| 4 | KOH | 5 | Zn $Cl_2$ | 10 | 2-(3) |
| 5 | $(NH_4)_2CO_3$ | 4 | Zn O | 8 | 1-(3) |
| 6 | $NH_4HCO_3$ | 5 | Zn $CO_3$ | 10 | " |
| 7 | NaOH | 9 | Zn $Cl_2$ | 16 | 2-(3) |
| 8 | " | 5 | " | 10 | " |
| 9 | " | 8 | " | 14 | " |
| 10 | $NH_4HCO_3$ | 4 | Zn O | 8 | 1-(3) |
| 11 | " | 4 | " | 8 | " |
| 12 | NaOH | 8 | Zn $Cl_2$ | 14 | 2-(3) |
| 13 | " | 8 | Ca $Cl_2$ | 15 | " |

$BF_3$.E: Ethyl ther complex of poron trifluoride
*1amount per 100 g resin
*21-(3) shows a procedure of 1-(3) in Synthesis Example 1, and 2-(3) shows a procedure of 2-(3) in Synthesis Example 2.

The yellowing resistance with the lapse of time, plastisizer-resistance of the developed images and the like are prominently excellent in the use of the color-developing agent of the present invention. Further these excellent effects are remarkable in the color-developing sheets in which the color-developing agent as a coating color is coated as thin layer on the surface of the support.

Therefore, this invention is described in detail by the following Examples of the color-developing sheets.

The properties of the color-developing sheets were tested by the following method.

(1) Color-developing rate and color-developing intensity.

A CB-sheet coated with pressure sensitive dip containing microcapsules and a color-developing sheet coated with a color-developing agent are laid so that the two coated surfaces are faced with each other. A pressure is applied to the two sheets by dot-plate roll calender to form a color. The reflectance $I_0$ of the sheet before color development, the reflectance $I_1$ of the sheet of 10 sec after color development, are measured by a Hunter Reflectometer (manufactured by Toyo Seiki Co; D type) using an amber filter. The color-developing rate ($J_1$) is expressed by the following equation:

$$\text{Color-developing rate } J_1 = \frac{I_0 - I_1}{I_0} \times 100\ (\%)$$

And color-developing intensity is expressed by the following equation, using the reflectance $I_2$ of the sheet of 24 hours after color development.

$$\text{Color-developing rate } J_2 = \frac{I_0 - I_2}{I_0} \times 100\ (\%)$$

Higher values of $J_1$ and $J_2$ are preferred.

(2) Plasticizer-resistance

A small amount of dioctyl phthalate used as plasticizer for vinyl chloride resins is coated on the colored surface of the color-developing sheet of 24 hours after color development by the method described in 1).

After leaving of one hour, the reflectance $I_3$ after testing by the same manner as in the method (1) was measured, and the color-developing intensity $J_3$ after the test is expressed by the equation.

$$J_3 = \frac{I_0 - I_3}{I_0} \times 100\ (\%)$$

From the color-developing intensity ($J_2$) and ($J_3$) before and after the test, the plasticizer resistance$=J_3/J_2\times 100(\%)$ is expressed.

Higher value means excellent plasticizer resistance of the developed image.

The value of more than 100% means the increases in image density by coating the plasticizer.

(3) Yellowing resistance (3)-(1)

Yellowing resistance under light of the color-developing sheet.

The color-developing sheet before color development is exposured 10 hours to sunlight. The reflectances $K_0$ and $K_1$ before and after exposure of sunlight, are measured by the above-described Reflectometer using a blue filter.

The retention $H_1$ of the whiteness is expressed by the following equation:

$$H_1 = \frac{K_1}{K_0} \times 100\ (\%)$$

Higher retention of whiteness means excellent yellowing-resistance under the light.

(3)-(2):

Yellowing-resistance under $NO_x$-gases of the color-developing sheet.

The color-developing sheet before color development is leaved for 2 hours in an atmosphere of $NO_2$-gas and then is tested in accordance with the test method of JIS L-1055-1961.

The reflectances $K_0$ and $K_2$ before and after the exposure of $NO_2$ gas are measured by the above-described Reflectometer using a blue filter. The retention $H_2$ of the whiteness is expressed by the following equation:

$$H_2 = \frac{K_2}{K_0} \times 100\ (\%)$$

Higher retention of whiteness means excellent yellowing-resistance under $NO_x$-gases.

(4) Light fastness

The colored surface of 24 hours after color development by following the method of (1) is exposed to a Fade-O-Meter for 6 hours. The reflectance is measured in the same method as in (1). From the reflectance $I_4$ after the exposure, the color-developing intensity $J_4$ is calculated by the following equation:

$$J_4 = \frac{I_0 - I_4}{I_0} \times 100\ (\%)$$

From the color-developing intensity $J_2$ and $J_4$ before and after the exposure, the light fastness is expressed by the following equation:

$$\text{light fastness } H_1 = \frac{J_3}{J_2} \times 100\ (\%)$$

Higher light fastness is preferred.

[EXAMPLE 1]

Using the Compound No. 1 obtained in Synthesis Example 1, a suspension of the following formulation was prepared by means of a sand grinding mill.

| | |
|---|---|
| Color-developing agent | 24.5 parts by weight |
| Sodium polyacrylate | 2.5 parts by weight |
| Water | 43.0 parts by weight |

A coating composition of the following formulation was preferred by using the above suspension.

| | |
|---|---|
| Suspension | 40 parts by weight |
| Calcium carbonate | 100 parts by weight |
| Styrene-butadiene latex (40%) | 15 parts by weight |
| Oxidized starch | 15 parts by weight |

The coating composition was coated on a sheet of fine paper and dried so that the amount of the coating composition applied was 6.0 g/m$^2$ upon drying. Thus, a color-developing sheet was obtained.

On the other hand, the transfer sheet coated with pressure-sensitive dye-containing microcapsules was prepared by the following procedure.

90 parts of a 10% aqueous solution of an ethylene-maleic anhydride copolymer (trade mark EMA 31, made by Monsanto Co.) and 90 parts of dilution water were mixed, and 10 parts of urea and 1 part of resorcinol were dissolved in the mixed solution. The obtained solution was adjusted to a pH-value of 3.4.

Separately, an oil mixture consisting of alkyldiphenylethane (trade mark: Hysol SAS 296, made by Nisseki Chemical Co.,) and diisopropylnaphthalene (trade mark: KMC-113, made by Kureha Chemical Co.) in a proportion of 1:2 was prepared.

As three core materials, (a) the oil of blue color-forming dye was prepared by dissolving 3% of crystal voilet lactone (CVL) and 1% of benzoyl leuco methylene blue in the above oil mixture, (b) the oil of black color-forming dye was prepared by dissolving 5% of 3-diethylamino-6-methyl-7-amilinofluoran, 1% of 3-diethylamino-6-methyl-7-diphenylmethylaminofluoran and 0.5% of 3-diethylamino-6-methyl-7-chlorofluoran in the above oil mixture, and (c) the oil of red color-forming dye was prepared by dissolving 3% of 8-diethylaminobenzo [c] fluoran and 2% of 3,3-bis(1-ethyl-2-methylindol-3-yl)phthalide in the above oil mixture.

180 parts of each of above dye oils were added to the above-produced aqueous solution of a pH-value having 3.4, and emulsified until an average particle size of 4.0 was obtained.

To this emulsion were added 27 parts of 37% formalin and heated to 55° C. After carrying out an encapsulation reaction at 55° C. for 2 hour, the reacted solution was adjusted to a pH-value of 7.5 by the addition of 28% aqueous ammonia solution to prepare three capsule slurries which contains pressure-sensitive dyes.

180 parts of each of the capsule slurries, 35 parts of wheat starch and 85 parts of 8% oxidized starch solution were mixed to prepare three kinds of coating solution.

These coating solution were independently coated in a coating weight of 4.5 g/m$^2$ on a fine paper having a basis weight of 45 g/m$^2$ to obtain (a) blue color-forming transfer sheet (b) black color-forming transfer sheet and (c) red color-forming transfer sheet. Each of the transfer sheets (a), (b) and (c) and a color-developing sheet containing the above Compound No. 1 are laid so that the coated surfaces of the sheets are faced with each other. A pressure is applied to these sheets to form a color.

The obtained colored sheets were tested with regard to color-developing rate, end color-developing intensity, plasticizer resistance, yellowing resistance and light fastness. The test results are summarized in Table 2.

The color-developing sheets of this invention are equivalent or better in all properties than those of the below-described Comparative Examples, and they provide much better yellowing-resistance and plasticizer-resistance of the colored image, and hence are preferable as color-developing agent and sheet for the pressure-sensitive recording sheet.

[EXAMPLES 2–13]

Using the Compound Nos. 2 through 13 as color-developing agents obtained in Synthesis Examples 2 through 13, the suspensions thereof, the coating solutions thereof and the color-developing sheets thereof were prepared in the same procedure as in Example 1. Each of the color-developing sheets in appropriate combination with each of the transfer sheets (A), (B) and (C) was tested. The test results are summarized in Table 2.

[COMPARATIVE EXAMPLE 1-1]

From the terpenephenol resin of Synthesis Example 1-(1), zinc salt of carboxylated terpenephenol resin was obtained by following the procedure in Synthesis Example 2-(3). Using the obtained resin, a color-developing sheet was prepared in the same manner as in Example 1.

[COMPARATIVE EXAMPLE 1-2]

100 weight-parts terpenephenol resin obtained in Synthesis Example 1-(1), 4 weight-parts of zinc oxide, 7.4 weight-parts of ammonium bicarbonate and 11.4 weight-parts of benzoic acid were charged in three-necked flask, were heated and melted on an oil bath at 150°-160° C. for 2 hours, and then were cooled to room temperature.

In this manner, a zinc modified terpenephenol resin (melting point: 90°-110° C.) was obtained.

Using the obtained resin, a color-developing sheet was prepared in the same procedure as in Example 1.

[COMPARATIVE EXAMPLE 2]

170 g of p-phenylphenol, 22.5 g of 37% aqueous paraformaldehyde solution, 2.0 g of p-toluenesulfonic acid and 250 g benzene were charged into a glass reacter, and heated with stirring to carry out the reaction, wherein the water formed by this reaction was removed off.

320 g of 10% aqueous sodium hydroxide solution were added thereto, and the steam distillation was carried out to remove off benzene. Then, aqueous hydrochloric acid was added dropwise thereto, wherein a crystallized p-phenylphenol-formaldehyde polymer was filtered, washed and dried. In such manner, 176 g of white pulverized resin (called as ppp-resin) were obtained. From the ppp-resin as color-developing agent, the color-developing sheet was prepared in the same manner as in Comparative Example 1.

[COMPARATIVE EXAMPLE 3]

Using p-tertiaryoctylphenol, p-tertiaryoctylphenol-formaldehydes polymer (called as pop-resin) was obtained in the same manner as in Comparative Example 2).

Zinc salt thereof was prepared from the pop-resin in the same procedure as in Synthesis Example 2-(3). The color-developing sheet was prepared from the obtained zinc salt in the same manner as in Comparative Example 1.

[COMPARATIVE EXAMPLE 4]

Using 3[4'-(αα'-dimethylbenzyl)phenyl]-5-[αα'-dimethylbenzyl)-salicylic acid zinc salt, the color-developing sheet was obtained in the same procedure as in Comparative Example 1.

Each of the color-developing sheets produced in Comparative Examples 1 through 4, in appropriate combination with each of transfer-sheets (A), (B) and (C), was tested. The test results are summarized in Table 2.

TABLE 2

Test results of color-developing sheet

| | Species of color-developing agent | Transfer sheet | Color-developing rate and intensity (%) [$J_1$] | [$J_2$] | Plasticizer-resistance [$J_3/J_2$] × 100(%) | Lightfastness [$J_4/J_2$] × 100(%) | Yellowing-resistance (%) Sunlight [$H_1$] | No$_2$—Gas [$H_2$] |
|---|---|---|---|---|---|---|---|---|
| Example 1 | Compound No. 1 | A Blue | 41, 5 | 56, 0 | 106, 0 | 33, 3 | 93, 5 | 92, 0 |
| | | B Black | 38, 5 | 57, 0 | 107, 5 | 95, 2 | — | — |
| | | C Red | 32, 0 | 48, 5 | 107, 0 | 90, 7 | — | — |
| Example 2 | Compound No. 2 | A | 42, 0 | 54, 0 | 95, 3 | 30, 0 | 92, 3 | 91, 0 |
| Example 3 | Compound No. 3 | A | 40, 0 | 55, 0 | 104, 7 | 31, 2 | 92, 0 | 89, 4 |
| Example 4 | Compound No. 4 | A | 43, 0 | 53, 5 | 94, 5 | 30, 4 | 91, 6 | 92, 2 |
| Example 5 | Compound No. 5 | A | 42, 5 | 55, 0 | 101, 2 | 32, 7 | 93, 2 | 91, 6 |
| | Compound No. 5 | B | 39, 0 | 56, 0 | 103, 4 | 94, 6 | — | — |
| Example 6 | Compound No. 6 | A | 41, 0 | 56, 0 | 105, 3 | 32, 5 | 91, 5 | 90, 7 |

TABLE 2-continued

Test results of color-developing sheet

| | Species of color-developing agent | Transfer sheet | Color-developing rate and intensity (%) [$J_1$] | [$J_2$] | Plasticizer-resistance [$J_3/J_2$] × 100(%) | Lightfastness [$J_4/J_2$] × 100(%) | Yellowing-resistance (%) Sunlight [$H_1$] | $No_2$—Gas [$H_2$] |
|---|---|---|---|---|---|---|---|---|
| Example 7 | Compound No. 7 | A | 42, 0 | 54, 5 | 101, 0 | 32, 1 | 90, 0 | 91, 3 |
| | Compound No. 7 | B | 39, 0 | 55, 5 | 101, 9 | 94, 0 | — | — |
| | Compound No. 7 | C | 32, 5 | 46, 5 | 102, 5 | 92, 3 | — | — |
| Example 8 | Compound No. 8 | A | 43, 0 | 53, 5 | 98, 7 | 29, 9 | 92, 2 | 93, 5 |
| Example 9 | Compound No. 9 | A | 41, 5 | 55, 0 | 102, 8 | 32, 0 | 92, 9 | 92, 7 |
| | Compound No. 9 | B | 38, 5 | 56, 0 | 102, 4 | 94, 4 | — | — |
| Example 10 | Compound No. 10 | A | 40, 5 | 55, 0 | 104, 5 | 33, 3 | 92, 8 | 90, 2 |
| Example 11 | Compound No. 11 | A | 42, 5 | 53, 5 | 100, 6 | 30, 8 | 90, 0 | 89, 7 |
| | Compound No. 11 | B | 39, 0 | 55, 0 | 100, 0 | 89, 0 | — | — |
| Example 12 | Compound No. 12 | A | 40, 5 | 53, 0 | 98, 3 | 30, 6 | 89, 8 | 89, 4 |
| Example 13 | Compound No. 13 | A | 42, 0 | 52, 0 | 96, 2 | 29, 8 | 90, 3 | 90, 6 |
| | | B | 39, 5 | 55, 0 | 101, 1 | 87, 7 | — | — |
| Comparative Example 1 | Compound No. 20 | A | 39, 0 | 45, 5 | 36, 5 | 16, 5 | 90, 4 | 90, 5 |
| | | B | 36, 0 | 50, 5 | 60, 7 | 68, 3 | — | — |
| 1 (2) | | A | 40, 3 | 47, 5 | 40, 4 | 20, 5 | 91, 0 | 89, 5 |
| | | B | 37, 5 | 51, 0 | 72, 6 | 71, 0 | — | — |
| 2 | PPP-resin | A | 41, 0 | 54, 0 | 38, 8 | 15, 0 | 83, 0 | 75, 0 |
| | | B | 36, 5 | 55, 5 | 64, 7 | 71, 4 | — | — |
| | | C | 30, 0 | 46, 5 | 73, 5 | 69, 6 | — | — |
| 3 | POP-Zincresin | A | 40, 5 | 52, 5 | 65, 1 | 18, 3 | 84, 1 | 80, 7 |
| 4 | Salicylic acid zinc salt deriative*1 | A | 41, 5 | 54, 5 | 94, 5 | 29, 7 | 89, 5 | 90, 2 |

*1 3[4'-(α, α'-dimethylbenzyl) phenyl]-5-(α, α'-dimethylbenzyl)-salicylic acid zine salt.

As is apparent from Table 2, the color developing recording sheet using the zinc salt of carboxylated terpenephenol resin of the present invention is much better color-developing ability, light foulness and plasticizer-resistance than that using the addition product of U.S. Pat. No. 4,540,998. That is, in Comparative Example 1-(2) which was prepared in accordance with U.S. Pat. No. 4,540,998, benzoic acid is used. In this case, a zinc salt of benzoic acid is formed, then participates with terpene-phenol additions product, wherein a weak intermolecular complex is produced.

Meanwhile, in the zinc salt of carboxylated terpene-phenol resin of the present invention, the carboxyl group is linked, in ortho- or para-position, with phenol which is added to terpene, and a carboxylic acid is contained in the same molecule, so that a salt with strong ion bonds is formed through zinc between two carboxylic acids which are present in the same or different molecule.

As is apparent from Table 2, the color-developing sheets of this invention are equivalent in yellowing-resistance, but better in other properties, as compared with the sheet of Comparative Example 1. Further, the color-developing sheets of this invention are equivalent in a color-developing ability, but prominent better in a yellowing-resistance under light and $NO_x$-gases, and a plasticizer-resistance and light fastness of developed image than the sheets of Comparative Examples 2 and 3, and they have better plasticizer-resistance, light fastness and yellowing resistance.

As is illustrated above, a cyclic monoterpene and a phenol are condensed in the presence of an acidic catalyst, carboxyl group is introduced in condensed product and metal is reacted with the resultant product to produce a metal salt of caroxylated terpenephenol resin. The color-developing sheets using this resin as color-developing material have equivalent or better color-developing ability and yellowing-resistance under sun- or fluorescence-light, than the color-developing sheets using conventional organic color-developing agents, particularly substituted phenols, p-phenylphenol and p-phenylphenol novolak resins.

Further, the sheets of this invention have superior plasticizer-resistance and light-resistance, specifically prominent better plasticizer-resistance.

These effects are particularly remarkable in the use of pressure-sensitive dyestuffs which discolor or fade readily in exposure under plasticizer and light, that is, in the use of crystal voilet lactone, etc. Therefore, this invention has great advantages that the discoloration and fading under exposure of plasticizer, light, etc are prevented in the image having the desired color-ton by the combined use of pressure-sensitive dyestuff. Further, this invention has other advantages that the manufacturing costs are low and hence inexpensive color-developing sheets can be obtained, in comparison with the usual color-developing sheets using conventionally known organic color-developing agents.

We claim:

1. A color-developing agent for pressure-sensitive recording sheet which comprises a polyvalent metal salt of carboxylated terpenephenol resin which is produced by
   (i) condensing a cyclic monoterpene and a phenol in presence of acidic catalyst to prepare a terpene-phenol resin,
   (ii) reacting the terpenephenol resin with carbon dioxide in presence of an alkali under high pressure and high temperature to prepare a carboxylated terpenephenol resin, and
   (iii) treating the carboxylated terpenephenol resin with an inorganic ammonium salt and at least one substance selected from the group consisting of oxides, hydroxides, chlorides, carbonates and sulfates of polyvalent metals, said phenol being used in an amount of 0.1–10 mole per mole of said terpene.

2. As color-developing agent according to claim 1, wherein said phenol is used in an amount of 0.4–5 mole per ml of said terpene.

3. A color-developing agent according to claim 1, wherein said terpenephenol resin has an average molecular weight of 350–1000 and a softening point of at least 70° C.

4. The color-developing agent according to claim 1, wherein said polyvalent metal is zinc.

* * * * *

UNITED STATES PATENT AND TRADEMARK OFFICE
CERTIFICATE OF CORRECTION

PATENT NO. : 4,759,797

DATED : 7-26-88

INVENTOR(S) : Hiroaki Umeda; Mamoru Suzuki; Akira Hasegawa; Kunio Hata

It is certified that error appears in the above—identified patent and that said Letters Patent is hereby corrected as shown below:

Column 5, line 27, change "be" to --are--.

Column 7, line 53, before "inclusion" insert --the--.

Table 1, line 5, change "Cotalyst" to --Catalyst--;

lines 7, 23 and 25, change "tarpentine" to --turpentine--;

line 43, change "Ethyl ther" to --Ethylether-- and change "poron" to --Boron--.

Column 12, line 25, change "preferred" to --prepared--;

line 56, change "amilinofluoran" to --anilinofluoran--.

Column 15, line 31, change "is" to --has--;

line 41, change "with" to --to--;

UNITED STATES PATENT AND TRADEMARK OFFICE

CERTIFICATE OF CORRECTION

PATENT NO. : 4,759,797

DATED : July 26, 1988

INVENTOR(S) : Hiroaki Umeda et al

It is certified that error appears in the above-identified patent and that said Letters Patent is hereby corrected as shown below:

Column 15, line 62, change "caroxylated" to --carboxylated--

Signed and Sealed this

Ninth Day of May, 1989

*Attest:*

DONALD J. QUIGG

*Attesting Officer*

*Commissioner of Patents and Trademarks*

UNITED STATES PATENT AND TRADEMARK OFFICE
CERTIFICATE OF CORRECTION

PATENT NO. : 4,759,797

DATED : July. 26, 1988

INVENTOR(S) : Hiroaki Umeda; Mamoru Suzuki; Akira Hasegawa; Kunio Hata

It is certified that error appears in the above-identified patent and that said Letters Patent is hereby corrected as shown below:

In Column 1, line 27, change "tp" to --top--; and line 35, change "containg" to --containing--.

Column 2, line 29, change "th" to --the--; and line 45, change "ight" to --light--.

Column 3, line 17, between "terpinolene" and "terpinene", enter --,--.

Column 5, line 50, change "os" to --of--.

Column 7, line 66, change "Arakaws" to --Arakawa--.

Column 10, line 1, change "as a" to --A--.

Column 15, line 31, change "foulness" to --fastness--.

Signed and Sealed this

Fifth Day of September, 1989

*Attest:*

DONALD J. QUIGG

*Attesting Officer*

*Commissioner of Patents and Trademarks*